United States Patent
Vadlamani et al.

(10) Patent No.: US 12,449,876 B1
(45) Date of Patent: Oct. 21, 2025

(54) APPARATUS, SYSTEM, AND METHOD FOR BOOSTING INTERNAL VOLTAGES OF POWER SUPPLY UNITS TO EXTEND HOLD-UP TIMES

(71) Applicant: Juniper Networks, Inc., Sunnyvale, CA (US)

(72) Inventors: Siri Subrahmanyam Vadlamani, Bangalore (IN); Prakash B. Kamanuri, Kalyan Maharashtra (IN)

(73) Assignee: Juniper Networks, Inc., Sunnyvale, CA (US)

( * ) Notice: Subject to any disclaimer, the term of this patent is extended or adjusted under 35 U.S.C. 154(b) by 90 days.

(21) Appl. No.: 18/184,836

(22) Filed: Mar. 16, 2023

(51) Int. Cl.
  *G06F 1/30* (2006.01)
  *H02M 1/00* (2007.01)
  *H02M 1/42* (2007.01)
  *H02M 7/21* (2006.01)
  *H02M 7/217* (2006.01)

(52) U.S. Cl.
  CPC ............ *G06F 1/30* (2013.01); *H02M 1/0054* (2021.05); *H02M 1/4225* (2013.01); *H02M 7/217* (2013.01)

(58) Field of Classification Search
  CPC ............... G06F 1/30; G06F 1/305; G06F 1/26
  USPC ......................................................... 713/300
  See application file for complete search history.

(56) References Cited

U.S. PATENT DOCUMENTS

| | | | | |
|---|---|---|---|---|
| 8,595,532 B1* | 11/2013 | Wright | ...................... | G06F 1/30 |
| | | | | 713/324 |
| 9,438,038 B1* | 9/2016 | Quaife | ..................... | H02J 1/102 |
| 10,224,802 B1* | 3/2019 | Chakkirala | ......... | H02M 3/3376 |
| 10,338,658 B2* | 7/2019 | Hung | ........................ | G06F 1/30 |
| 2009/0097286 A1* | 4/2009 | Lin | ..................... | H02M 3/1584 |
| | | | | 363/65 |
| 2010/0014330 A1* | 1/2010 | Chang | ................. | H02M 7/2176 |
| | | | | 363/89 |
| 2010/0332896 A1* | 12/2010 | Wilson | ...................... | G06F 1/30 |
| | | | | 714/E11.054 |
| 2011/0133560 A1* | 6/2011 | Yamashita | ................ | G06F 1/30 |
| | | | | 307/66 |
| 2012/0106206 A1* | 5/2012 | Tang | ................... | H02M 3/3376 |
| | | | | 363/21.02 |
| 2014/0258755 A1* | 9/2014 | Stenfort | ..................... | G06F 1/30 |
| | | | | 713/323 |
| 2015/0244207 A1* | 8/2015 | Narita | ..................... | H02J 9/061 |
| | | | | 307/64 |
| 2015/0268709 A1* | 9/2015 | Morning-Smith | ...... | H02J 7/345 |
| | | | | 307/64 |
| 2016/0190934 A1* | 6/2016 | Hung | ................ | H02M 3/33576 |
| | | | | 363/21.01 |

(Continued)

*Primary Examiner* — Jaweed A Abbaszadeh
*Assistant Examiner* — Cheri L Harrington
(74) *Attorney, Agent, or Firm* — Greenberg Traurig, LLP (57) ABSTRACT

A disclosed apparatus may boost internal voltages of power supply units (PSUs) to extend hold-up times. For example, an apparatus may include a PSU and a controller. In one example, the PSU may be configured to convert power from an AC input into a direct current (DC) output and provide the DC output to a computing device. In this example, the controller may be configured to detect a loss of the AC input and extend a hold-up time of the PSU in response to detecting the loss of the AC input by modifying at least one switch included in the PSU. Various other apparatuses, systems, and methods are also disclosed.

14 Claims, 7 Drawing Sheets

(56) References Cited

U.S. PATENT DOCUMENTS

| | | | | |
|---|---|---|---|---|
| 2017/0329380 A1* | 11/2017 | Hung | ................ | H02M 1/4225 |
| 2018/0032390 A1* | 2/2018 | Rahmanian | ......... | G06F 11/0754 |
| 2019/0243759 A1* | 8/2019 | Stonelake | ........... | G06F 12/0868 |
| 2020/0382004 A1* | 12/2020 | Chan | ........................ | H02M 7/04 |
| 2021/0265913 A1* | 8/2021 | Cannillo | ............... | H02M 3/158 |
| 2022/0078548 A1* | 3/2022 | Dang | .................... | H03G 3/348 |
| 2022/0357956 A1* | 11/2022 | Johnson | .................... | G06F 1/28 |
| 2023/0361730 A1* | 11/2023 | Garrett | ................. | H02M 1/007 |
| 2024/0186818 A1* | 6/2024 | Vijayvargiya | .......... | H02J 7/345 |
| 2024/0201761 A1* | 6/2024 | Shih | ......................... | G06F 1/26 |

\* cited by examiner

APPARATUS, SYSTEM, AND METHOD FOR BOOSTING INTERNAL VOLTAGES OF POWER SUPPLY UNITS TO EXTEND HOLD-UP TIMES

BACKGROUND

Power supply units (PSUs) are often able to supply sufficient power to sustain operation of computing devices for a short period after losing an alternating current (AC) source. For example, after a PSU loses its AC source, the PSU may be able to supply enough power to sustain a computing device for several milliseconds. In this example, the PSU may produce a signal indicative of the status of the AC source, and the computing device may monitor this signal to detect a loss of the AC source. By doing so, the computing device may be able to anticipate the resulting power loss and shut down safely and/or properly ahead of that power loss, thereby avoiding any unpredictable behavior. The amount of time that the PSU is able to sustain the computing device after losing the AC source may sometimes be referred to as the PSU's hold-up time.

The instant disclosure identifies and addresses a need for additional apparatuses, systems, and methods that facilitate extending hold-up times by boosting internal voltages of PSUs.

SUMMARY

As will be described in greater detail below, the instant disclosure generally relates to apparatuses, systems, and methods for boosting internal voltages of PSUs to extend hold-up times. In some examples, an apparatus for accomplishing such a task may include and/or represent a PSU and a controller. In one example, the PSU may be configured to convert power from an AC input into a direct current (DC) output and provide the DC output to a computing device. In this example, the controller may be configured to detect a loss of the AC input and extend a hold-up time of the PSU in response to detecting the loss of the AC input by modifying an operational state of at least one switch included in the PSU.

Similarly, a corresponding system may include and/or represent a computing device, a PSU, and a controller. In one example, the PSU may be configured to convert power from an AC input into a DC output and provide the DC output to a computing device. In this example, the controller may be configured to detect a loss of the AC input and extend a hold-up time of the PSU in response to detecting the loss of the AC input by modifying an operational state of at least one switch included in the PSU.

Additionally or alternatively, a corresponding method may include and/or involve (1) detecting, by a controller, a loss of an AC input electrically coupled to a PSU configured to provide a DC output to a computing device, and then in response to detecting loss of the AC input, (2) modifying, by the controller, an operational state of at least one switch included in the PSU, and (3) boosting, as a result of the operational state being modified, a power rail within the PSU to extend a hold-up time of the PSU.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for boosting internal voltages of PSUs to extend hold-up times. As will be explained in greater detail below, embodiments of the instant disclosure may involve increasing and/or boosting internal voltages of PSUs by modifying the operational state(s) of one or more switches included in the PSUs. For example, upon detecting the loss of a PSU's AC source, a controller may activate and/or deactivate one or more transistors included in the PSU. By doing so, the controller may enable the PSU to increase and/or boost the voltage of an internal power rail by accessing, leveraging, and/or recovering energy stored in one or more bulk capacitors electrically coupled to the transistors.

This increased and/or boosted voltage level may enable the PSU to extend and/or prolong its hold-up time, thereby affording a computing device powered by the PSU additional time to shut down safely and/or properly ahead of the imminent power loss. By shutting down ahead of the imminent power loss, the computing device may be able to avoid any unpredictable behavior and/or loss of data. Accordingly, the PSU and/or the controller may be able to extend and/or prolong the PSU's hold-up time without incurring the cost of bigger bulk capacitors.

The following will provide, with reference to FIGS. 1-6 detailed descriptions of exemplary apparatuses, systems, components, and corresponding implementations for boosting internal voltages of PSUs to extend hold-up times. Detailed descriptions of computer-implemented methods for boosting internal voltages of PSUs to extend hold-up times will be provided in connection with FIG. 7.

Figure 1:
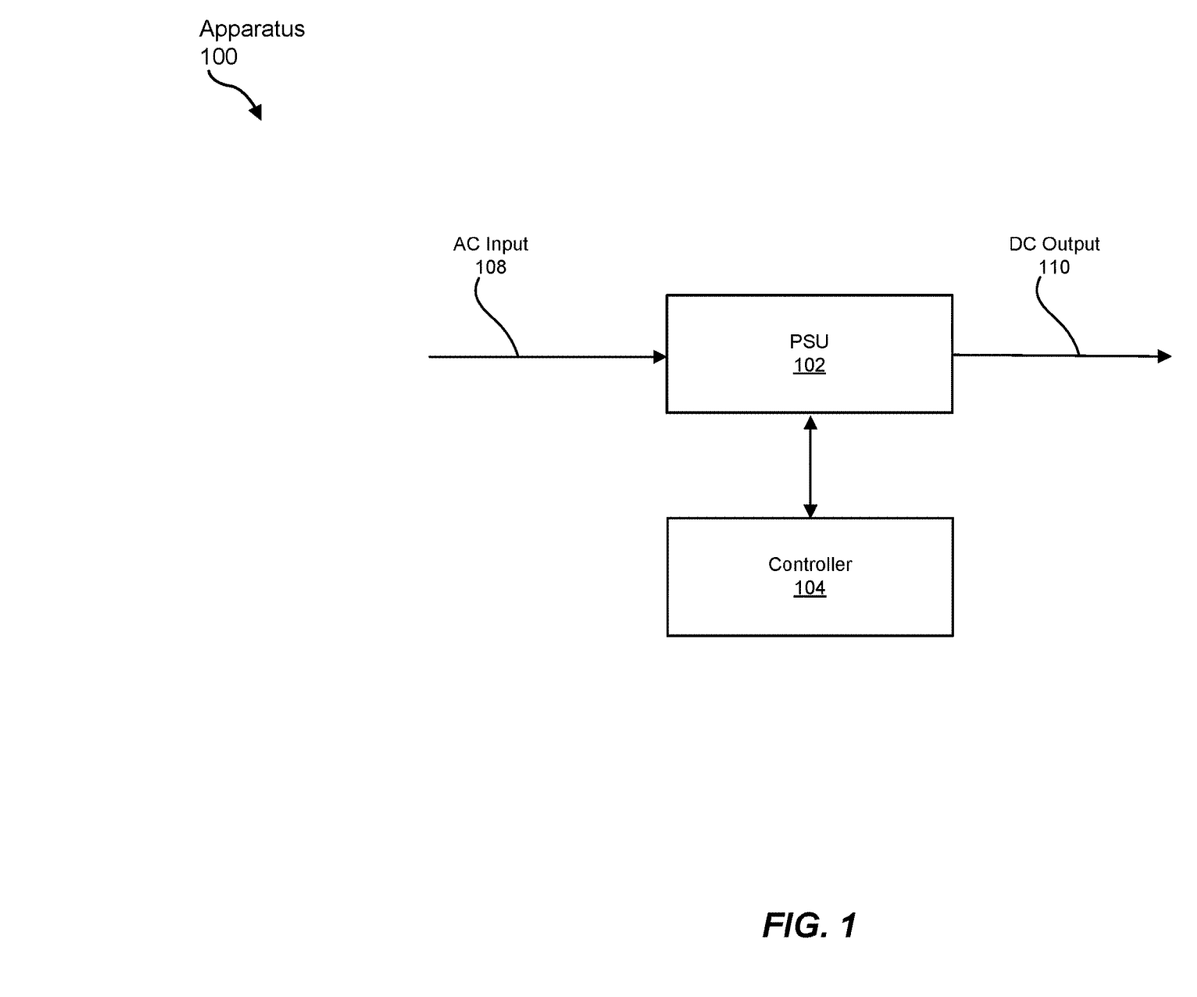
FIG. 1 is a block diagram of an exemplary apparatus capable of boosting internal voltages of PSUs to extend hold-up times according to one or more embodiments of this disclosure.

FIG. 1 illustrates an exemplary apparatus 100 capable of boosting internal voltages of PSUs to extend hold-up times. In some examples, apparatus 100 may include and/or represent a PSU 102 and a controller 104. In such examples, controller 104 may be electrically and/or communicatively coupled to PSU 102. For example, controller 104 and PSU 102 may communicate with one another via an inter-integrated circuit ($I^2C$) bus, a serial peripheral interface (SPI) bus, and/or the like. In one example, PSU 102 may be configured and/or arranged to convert and/or transform power from an AC input 108 into a DC output 110. In this example, PSU 102 may be configured and/or arranged to provide and/or deliver DC output 110 to a computing device for consumption and/or use.

In some examples, controller 104 may be configured and/or programmed to detect and/or identify the loss of AC input 108. For example, controller 104 may monitor an undervoltage lockout (UVLO) signal of PSU 102 to detect and/or identify the loss of AC input 108. In this example, the UVLO signal may indicate and/or reflect the status of the AC source electrically coupled to PSU 102. Controller 104 and/or the computing device may monitor this UVLO signal to detect and/or identify an imminent loss of power resulting from a failure and/or disconnection of the AC source.

In some examples, controller 104 may determine that the AC source electrically coupled to AC input 108 is no longer supplying power to PSU 102 based at least in part on the UVLO signal. For example, as the UVLO signal approaches a certain threshold, controller 104 may detect and/or determine that the AC source has been lost and/or is no longer supplying power to AC input 108. In one example, the loss of this AC source may result from the cable between AC input 108 and the wall outlet becoming disconnected and/or unplugged. In another example, the loss of this AC source may result from a power outage and/or blackout affecting the building that houses apparatus 100.

In some examples, controller 104 may also be configured and/or programmed to extend the hold-up time of PSU 102 by increasing and/or boosting the voltage level of an internal power rail of PSU 102 in response to the loss of the AC source. For example, controller 104 may detect and/or identify the loss of the AC power source on AC input 108. In response to detecting the loss of the AC power source on AC input 108, controller 104 may extend the hold-up time of PSU 102 by increasing and/or boosting the voltage level of the internal power rail.

In some examples, PSU 102 may include and/or represent one or more physical devices and/or circuits capable of converting and/or transforming AC power into DC power. For example, PSU 102 may convert and/or transform mains AC electricity (e.g., 120-volt or 230-volt AC power) from the power grid into lower-voltage DC power (e.g., 12-volt or 54-volt DC power) sufficient to energize, operate, and/or run the computing device. In this example, PSU 102 may supply, provide, and/or deliver the DC power to the computing device. In certain implementations, PSU 102 may include and/or be equipped with a cable that is plugged into a power outlet and/or generator. In such implementations, when its cable is plugged into a power outlet and/or generator in this way, PSU 102 may be able to draw AC power from the power outlet and/or generator, convert that AC power to DC power, and then deliver that DC power to the computing device.

In some examples, controller 104 may include and/or represent one or more hardware-implemented processors and/or compute modules capable of interpreting and/or executing computer-readable instructions. Additionally or alternatively, controller 104 may include and/or represent any type or form of circuitry that processes, converts, and/or transforms input, data, or signals in one way or another. In one example, controller 104 may include and/or represent multiple circuits distributed across apparatus 100 and/or throughout a larger computing system. Examples of controller 104 include, without limitation, physical processors, central processing units (CPUs), microprocessors, microcontrollers, field-programmable gate arrays (FPGAs), application-specific integrated circuits (ASICs), systems on chips (SoCs), parallel accelerated processors, tensor cores, integrated circuits, chiplets, portions of one or more of the same, combinations or variations of one or more of the same, and/or any other suitable controller.

Controller 104 may represent part of and/or be incorporated into various devices and/or locations of a larger computing system. For example, controller 104 may represent part of and/or be incorporated into the computing device that is powered by PSU 102 via DC output 110. In this example, controller 104 may also perform various tasks described herein on behalf of and/or in connection with the computing device. In another example, although not necessarily illustrated in this way in FIG. 1, controller 104 may represent part of and/or be incorporated into PSU 102. In a further example, controller 104 may constitute and/or represent standalone circuitry and/or a separate device that is district from but associated with PSU 102 and/or the computing device.

Figure 2:
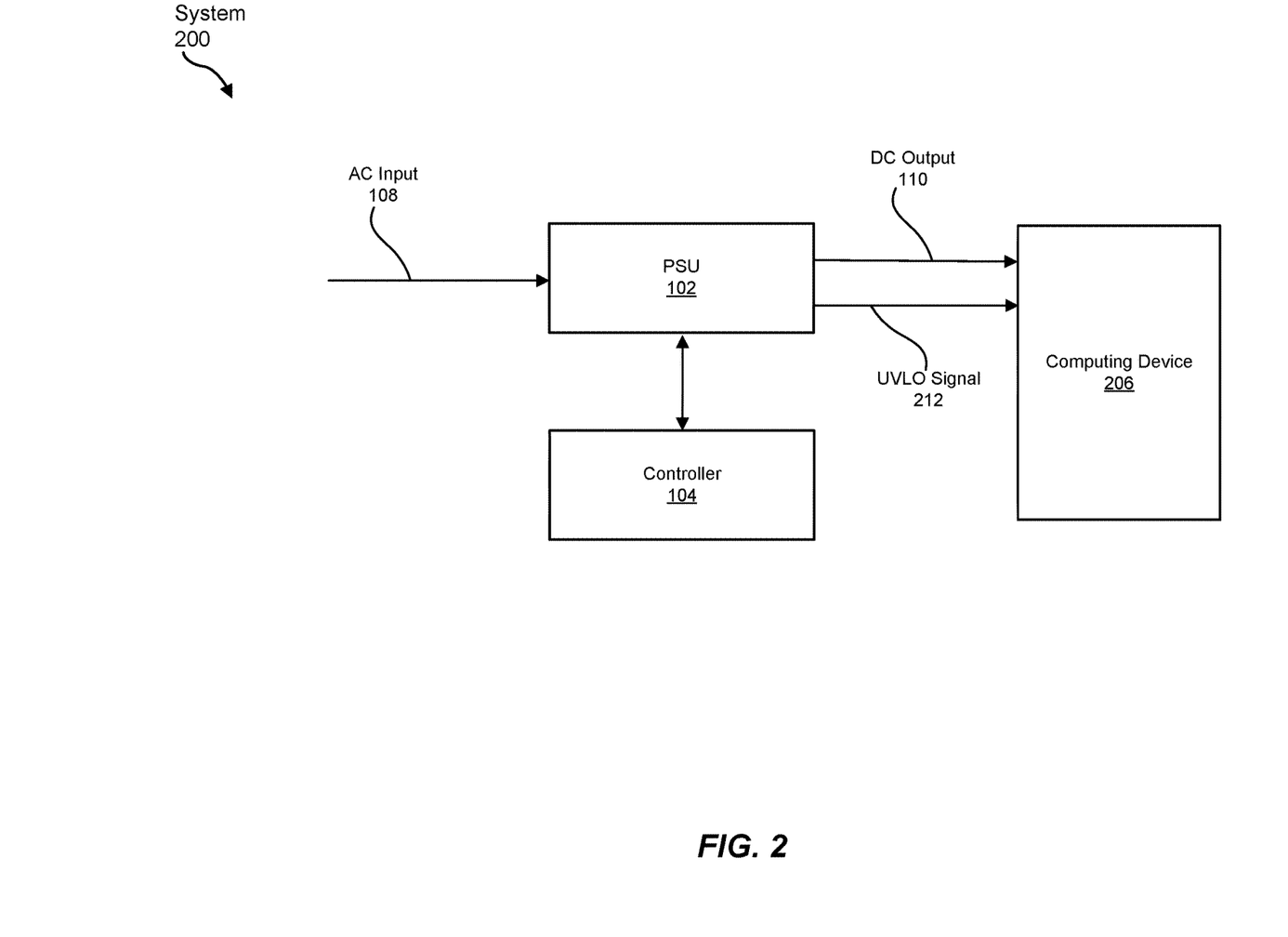
FIG. 2 is a block diagram of an exemplary system capable of boosting internal voltages of PSUs to extend hold-up times according to one or more embodiments of this disclosure.

Exemplary apparatus 100 in FIG. 1 may be implemented in a variety of ways. For example, all or a portion of exemplary apparatus 100 may include and/or represent portions of an exemplary system 200 in FIG. 2 capable of boosting internal voltages of PSUs to extend hold-up times. In some examples, system 200 may include and/or represent certain components, configurations, and/or features that perform and/or provide functionalities that are similar and/or identical to those described above in connection with FIG. 1. As illustrated in FIG. 2, computing device 206 may be electrically coupled to PSU 102 via a DC output 110. Additionally or alternatively, computing device 206 and/or controller 104 may be communicatively coupled to PSU 102 via a UVLO signal 212.

In some examples, like apparatus 100 in FIG. 1, system 200 may include and/or represent controller 104, which is communicatively coupled to PSU 102 and/or computing device 206. In one example, controller 104 may monitor the status of PSU 102 and/or its AC power source. For example, PSU 102 may communicate and/or provide a periodic heartbeat to controller 104 (e.g., via an $I^2C$ bus, an SPI bus, UVLO signal 212, or a separate signal). In this example, controller 104 may detect and/or determine that PSU 102 has failed and/or gone down based at least in part on the sudden absence and/or discontinuation of the heartbeat. Additionally or alternatively, controller 104 may detect and/or determine that PSU 102 has failed and/or gone down based at least in part on the PSU's non-responsiveness and/or lack of communication. Further, controller 104 may detect and/or determine that PSU 102 has failed and/or gone down based at least in part on a message and/or notification received from the PSU.

As another example, PSU 102 may communicate and/or provide the status of the corresponding AC source to controller 104 (e.g., via an I²C bus, an SPI bus, UVLO signal 212, or a separate signal). In this example, controller 104 may detect and/or determine that the AC source for PSU 102 has failed, gone down, and/or been lost based at least in part on the status communicated and/or provided by PSU 102. In response to detecting the loss of the AC source on AC input 108, controller 104 may extend and/or prolong the hold-up time of PSU 102 by boosting the voltage level of a power rail internal to PSU 102. By doing so, controller 104 may effectively obtain, facilitate, and/or provide more time for computing device 206 to shut down safely and/or properly before the imminent power loss forces computing device 206 to do so in a potentially unsafe and/or improper way.

In some examples, computing device 206 may detect and/or identify an imminent power loss, which will likely cause computing device 206 to shut down, based at least in part on UVLO signal 212. For example, computing device 206 may monitor UVLO signal 212 for evidence that the AC source for PSU 102 has failed, gone down, and/or been lost. Although not necessarily illustrated in this way in FIG. 2, controller 104 may represent part of and/or be incorporated into computing device 206 and may thus perform these tasks for computing device 206. In one example, UVLO signal 212 may include and/or represent analog signals indicative of the amounts of charge stored by capacitors (e.g., DC bulk capacitors) internal to PSU 102.

In some examples, UVLO signal 212 may indicate, to computing device 206 and/or controller 104, whether PSU 102 is able to provide a sufficient amount to power to sustain computing device 206. For example, if UVLO signal 212 drops from 400 volts and approaches a lower threshold (e.g., 300 volts), computing device 206 and/or controller 104 may sense and/or identify this drop from 400 volts toward the threshold as evidence that the corresponding AC source(s) has been lost. As a result of this drop, computing device 206 and/or controller 104 may determine that PSU 102 is no longer able to provide sufficient power to sustain computing device 206 for much longer. To address this issue in advance of the forthcoming power loss, computing device 206 may initiate a shutdown process that saves its current state and/or data.

In some examples, computing device 206 may include and/or represent a physical device and/or system capable of reading computer-executable instructions, handling network traffic, and/or communicating with remote devices. In one example, computing device 206 may include and/or represent a network device that facilitates and/or supports the flow of traffic within a network and/or across networks. Additional examples of computing device 206 include, without limitation, routers (such as a transit label switching router, a label edge router, a provider edge router, a hub router, a spoke router, an autonomous system boundary router, and/or an area border router), switches, hubs, modems, bridges, repeaters, gateways (such as broadband network gateways), multiplexers, network adapters, network interfaces, linecards, collectors, client devices, laptops, tablets, desktops, servers, cellular phones, gaming consoles, portions of one or more of the same, variations or combinations of one or more of the same, and/or any other suitable computing device.

Figure 3:
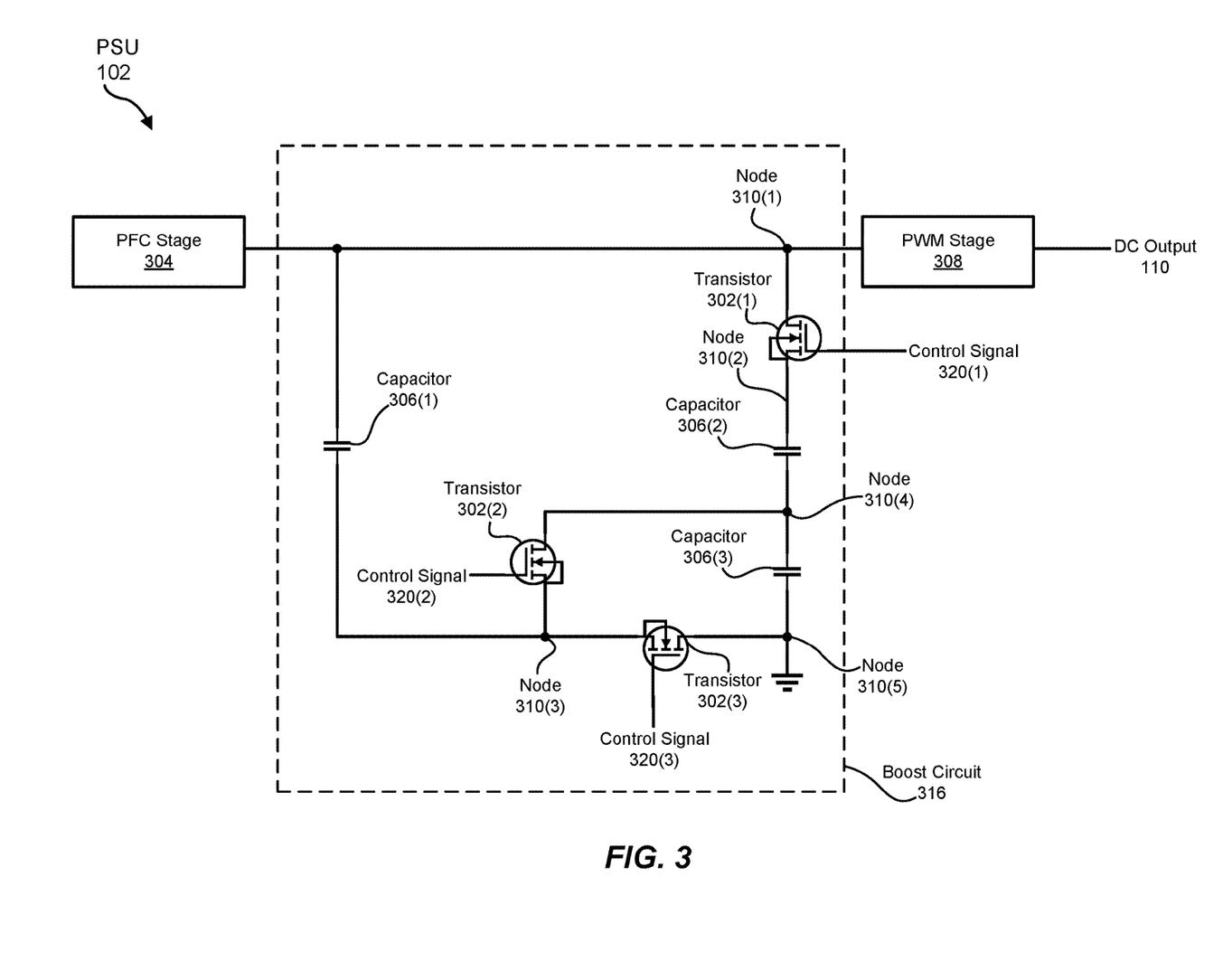
FIG. 3 is a block diagram of an exemplary PSU that facilitates extending hold-up times for computing devices according to one or more embodiments of this disclosure.

FIG. 3 illustrates a portion of an exemplary implementation of PSU 102 capable of extending hold-up times for a computing device. In some examples, PSU 102 may include and/or represent certain components, configurations, and/or features that perform and/or provide functionalities that are similar and/or identical to those described above in connection with either FIG. 1 or FIG. 2. As illustrated in FIG. 3, PSU 102 may include and/or represent a power factor correction (PFC) stage 304, a pulse-width modulation (PWM) stage 308, and/or a boost circuit 316. In one example, boost circuit 316 of PSU 102 may include and/or represent a transistor 302(1), a transistor 302(2), a transistor 302(3), a capacitor 306(1), a capacitor 306(2), and/or a capacitor 306(3).

In some examples, one terminal of capacitor 306(1), transistor 302(1), PFC stage 304, and PWM stage 308 may be electrically coupled to one another at node 310(1). In one example, one terminal of transistor 302(1) and capacitor 306(2) may be electrically coupled to one another at node 310(2). In this example, one terminal of capacitor 306(1), transistor 302(2), and transistor 302(3) may be electrically coupled to one another at node 310(3). Additionally or alternatively, one terminal of capacitor 306(2), capacitor 306(3), and transistor 302(2) may be electrically coupled to one another at node 310(4). Further, another terminal of transistor 302(3) and capacitor 306(3) may be electrically coupled to one another at node 310(5).

In some examples, another terminal of PWM stage 308 may represent and/or carry DC output 110 to computing device 206. In one example, another terminal of transistor 302(1) may represent and/or carry a control signal 320(1) provided by controller 104. In this example, another terminal of transistor 302(2) may represent and/or carry a control signal 320(2) provided by controller 104. Additionally or alternatively, another terminal of transistor 302(3) may represent and/or carry a control signal 320(3) provided by controller 104.

In some examples, one or more of transistors 302(1)-(3) may include and/or represent a metal-oxide-semiconductor field-effect transistor (MOSFET). For example, transistor 302(1) may include and/or represent an n-type or n-channel MOSFET whose source, drain, and gate are electrically coupled to node 310(2), node 310(1), and control signal 320(1), respectively. In this example, transistor 302(2) may include and/or represent an n-type or n-channel MOSFET whose source, drain, and gate are electrically coupled to node 310(3), node 310(4), and control signal 320(2), respectively. Additionally or alternatively, transistor 302(3) may include and/or represent an n-type or n-channel MOSFET whose source, drain, and gate are electrically coupled to node 310(3), node 310(5), and control signal 320(3), respectively. In an alternative example (not necessarily illustrated or reflected in FIG. 3), transistors 302(1)-(3) may include and/or represent p-type or p-channel MOSFETs whose sources, drains, and gates are electrically coupled in similar or different configurations.

In some examples, node 310(1) may include and/or represent a power rail configured to deliver electric current from one or more of capacitors 306(1)-(3) to PWM stage 308. In one example, node 310(3) may include and/or represent a variable node configured to be selectively shorted to ground when transistor 302(2) is deactivated and transistor 302(3) is activated. For example, node 310(5) may constitute and/or represent an electrical ground configured to serve as a reference point for voltage levels within PSU 102. Additionally or alternatively, node 310(4) may include and/or represent a branching node configured to provide electric current from capacitor 306(3) through a parallel combination of capacitors 306(1) and 306(2) to PWM stage 308 when transistor 302(2) is activated and transistor 302(3) is deactivated.

In some examples, PWM stage 308 may include and/or represent switching circuitry that reduces, converts, and/or transforms the higher voltage present on node 310(1) to the lower voltage present on DC output 110. In one example, this switching circuitry may achieve and/or accomplish this reduction of the higher input voltage to the lower output voltage via PWM. In this example, the PWM may be tuned and/or applied to output power of a specific voltage level (e.g., 12 or 54 volts) for consumption by computing device 206.

In some examples, transistor 302(1)-(3) may each serve and/or be implemented as a switch that creates a short circuit when activated and an open circuit when deactivated. In one example, during normal operation, controller 104 may activate transistors 302(1) and 302(3) and deactivate transistor 302(2). In this example, transistor 302(1) may create and/or form a short circuit between node 310(1) and 310(2), and transistor 302(3) may create and/or form a short circuit between nodes 310(3) and 310(5). In addition, transistor 302(2) may create and/or from an open circuit between nodes 310(3) and 310(4).

In one example, in response to detecting a power-loss event, controller 104 may deactivate transistors 302(1) and 302(3) and activate transistor 302(2). In this example, transistor 302(1) may create and/or form a unidirectional connection that enables electric current to flow from node 310(2) to node 310(1) via a body diode of transistor 302(1), and transistor 302(3) may create and/or form an open circuit between nodes 310(3) and 310(5). In addition, transistor 302(2) may create and/or from a short circuit between nodes 310(3) and 310(4).

In some examples, controller 104 may modify the operational states of transistors 302(1)-(3) in a specific pattern and/or sequence via control signals 320(1)-(3), respectively. For example, in response to detecting the loss of AC input 108, controller 104 may first deactivate transistor 302(3) to create an open circuit and then deactivate transistor 302(1) to create a unidirectional connection via the body diode. Finally, controller 104 may activate transistor 302(2) to create a short circuit. Put differently, controller 104 may turn off transistor 302(3) and then turn off transistor 302(1) after transistor 302(3). Once both of transistors 302(1) and 302(3) are turned off, controller 104 may turn on transistor 302(2).

By doing so, controller 104 may enable capacitor 306(3) to operate in series with the parallel combination of capacitors 306(1) and 306(2), thus resulting in an effectively reduced overall capacitance for the same stored energy. By operating in this way, capacitors 306(1)-(3) may cause and/or generate a momentary spike, burst, and/or boost of power to PWM stage 308. As a result, the voltage level at node 310(1) may remain and/or stay above the cutoff threshold of PWM stage 308 for a bit longer, which effectively extends the hold-up time of PSU 102 and/or prolongs the protection for computing device 206 in the event of an AC dropout condition.

Figure 4:
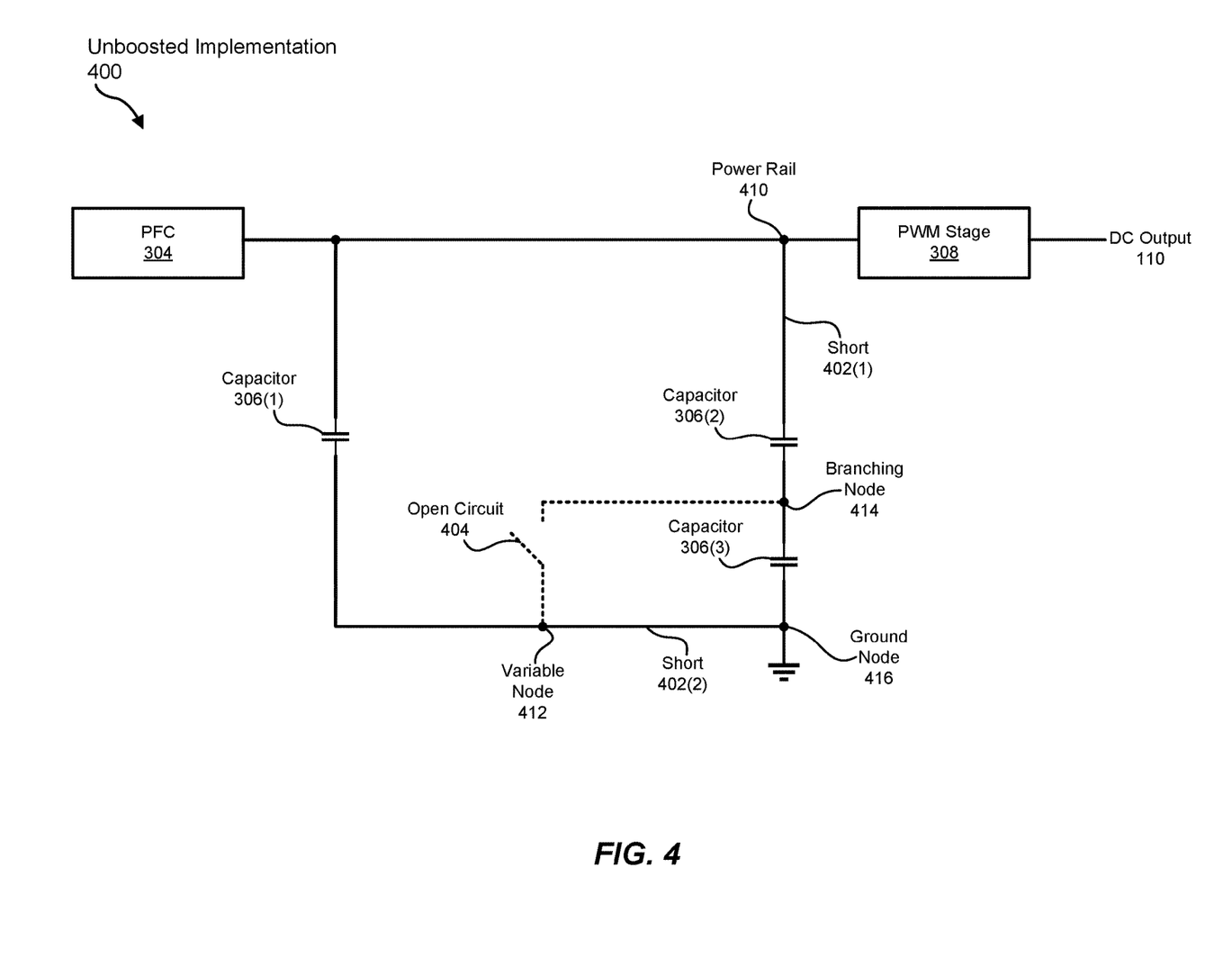
FIG. 4 is a block diagram of an exemplary unboosted implementation of a PSU that facilitates extending hold-up times for computing devices according to one or more embodiments of this disclosure.

FIG. 4 illustrates an exemplary unboosted implementation 400 of PSU 102 that exists and/or is applied under normal operating conditions prior to a power-loss event. In some examples, unboosted implementation 400 of PSU 102 may include and/or represent certain components, configurations, and/or features that perform and/or provide functionalities that are similar and/or identical to those described above in connection with any of FIGS. 1-3. As illustrated in FIG. 4, unboosted implementation 400 of PSU 102 may involve creating a short 402(1) between a power rail 410 and capacitor 306(2) via a programmable switch (e.g., transistor 302(1)) and/or creating a short 402(2) between a variable node 412 and a ground node 416 via another programmable switch (e.g., transistor 302(3)). In one example, unboosted implementation 400 of PSU 102 may also involve creating an open circuit 404 between a branching node 414 and variable node 412 via a further programmable switch (e.g., transistor 302(2)).

In some examples, power rail 410 may deliver and/or provide electric current and/or charge from one or more of capacitors 306(1)-(3) to PWM stage 308. In one example, variable node 412 may be selectively shorted to ground node 416. In this example, capacitor 306(1) may operate in parallel with the serial combination of capacitors 306(2) and 306(3), thus resulting in an effectively increased overall capacitance for the same stored energy.

Figure 5:
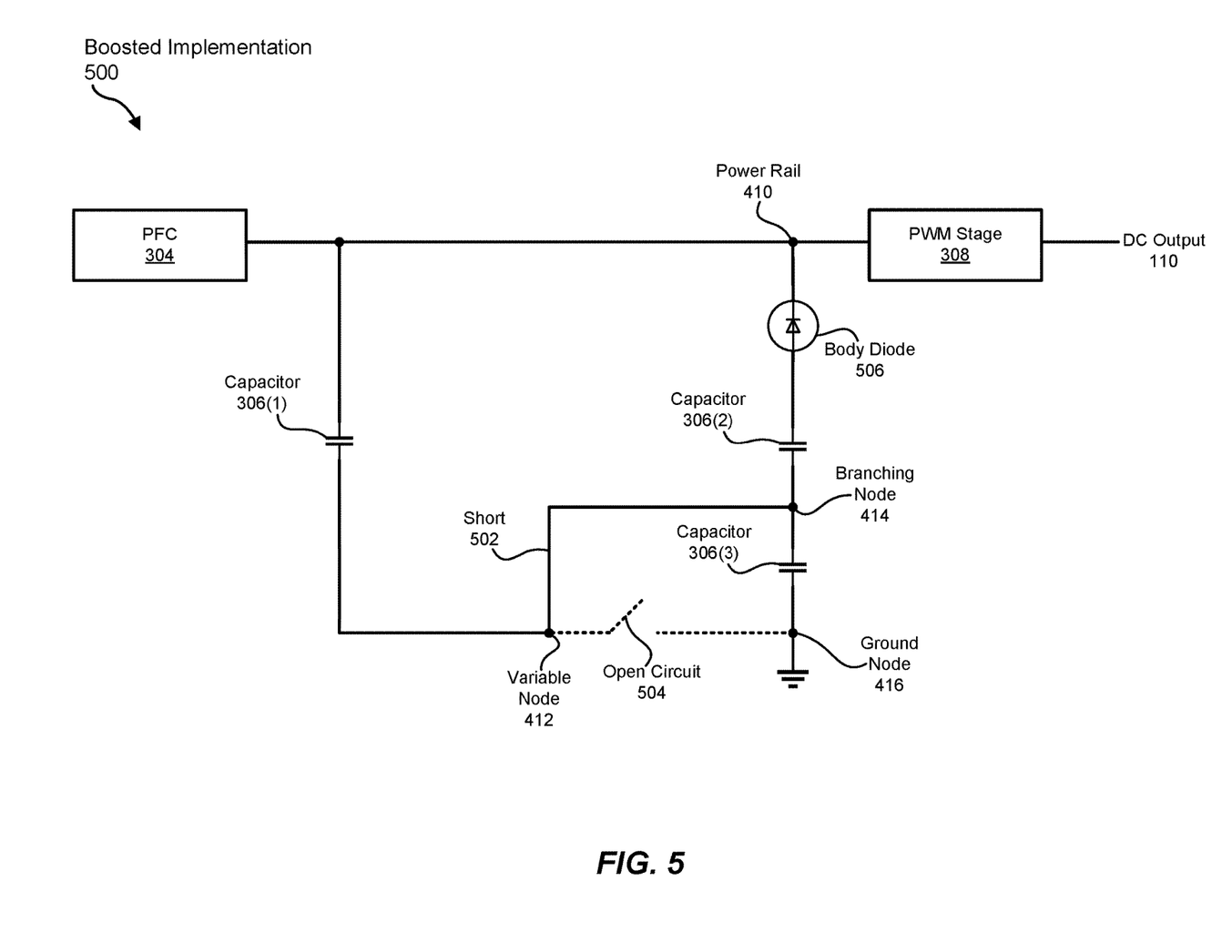
FIG. 5 is a block diagram of an exemplary boosted implementation of a PSU that facilitates extending hold-up times for computing devices according to one or more embodiments of this disclosure.

FIG. 5 illustrates an exemplary boosted implementation 500 of PSU 102 that is triggered and/or applied in response to a power-loss event. In some examples, boosted implementation 500 of PSU 102 may include and/or represent certain components, configurations, and/or features that perform and/or provide functionalities that are similar and/or identical to those described above in connection with any of FIG. 1-4. As illustrated in FIG. 5, boosted implementation 500 of PSU 102 may involve activating a short 502 between variable node 412 and branching node 414, which is created and/or formed by closing a programmable switch (e.g., transistor 302(2)).

In some examples, boosted implementation 500 of PSU 102 may also involve creating an open circuit 504 between variable node 412 and ground node 416, which is achieved and/or accomplished by opening another programmable switch (e.g., transistor 302(3)). As a result, the voltage level of power rail 410 may be boosted and/or increased relative to unboosted implementation 400 of PSU 102 by the reduction in the effective overall capacitance for the same stored energy after the programmable switches are modified in response to the power-loss event. In one example, the reduction in the effective overall capacitance for the same stored energy may boost and/or increase the voltage differential between power rail 410 and ground node 416 via capacitor 306(1) and/or capacitor 306(2).

In some examples, transistor 302(1) may include and/or contain a body diode 506 that prevents the passage and/or flow of electric current from power rail 410 to node 310(2) and/or capacitor 306(2). In such examples, despite preventing the passage and/or flow of electric current in that direction, body diode 506 may still facilitate, support, and/or allow the passage or flow of electric current from node 310(2) and/or capacitor 306(2) to power rail 410. In one example, body diode 506 may be activated and/or applied when transistor 302(1) is turned off and/or deactivated. For example, when controller 104 turns off and/or deactivates transistor 302(1) via control signal 320(1), body diode 506 may allow the flow of electric current from capacitor 306(2) to power rail 410 and/or prevent the flow of electric current from power rail 410 to capacitor 306(2).

In some examples, boosted implementation 500 may extend and/or prolong the hold-up time of PSU 102 by a certain percentage that enables computing device 206 to save its current state and/or shut down safely or properly. In one example, boosted implementation 500 may extend and/ or prolong the hold-up time by ten percent, fifteen percent, twenty percent, or more relative to unboosted implementation 400. For example, boosted implementation 500 may extend and/or prolong the hold-up time of PSU 102 from 11 milliseconds to 13.38 milliseconds.

In some examples, boosted implementation 500 may boost and/or increase the voltage at power rail 410 by a certain percentage that facilitates the extension of the hold-up time. In one example, boosted implementation 500 may boost and/or increase the voltage of power rail 410 by twenty percent, twenty-five percent, thirty percent, or more relative to unboosted implementation 400. For example, boosted implementation 500 may boost and/or increase the voltage of power rail 410 from 300 volts to 400 volts.

Figure 6:
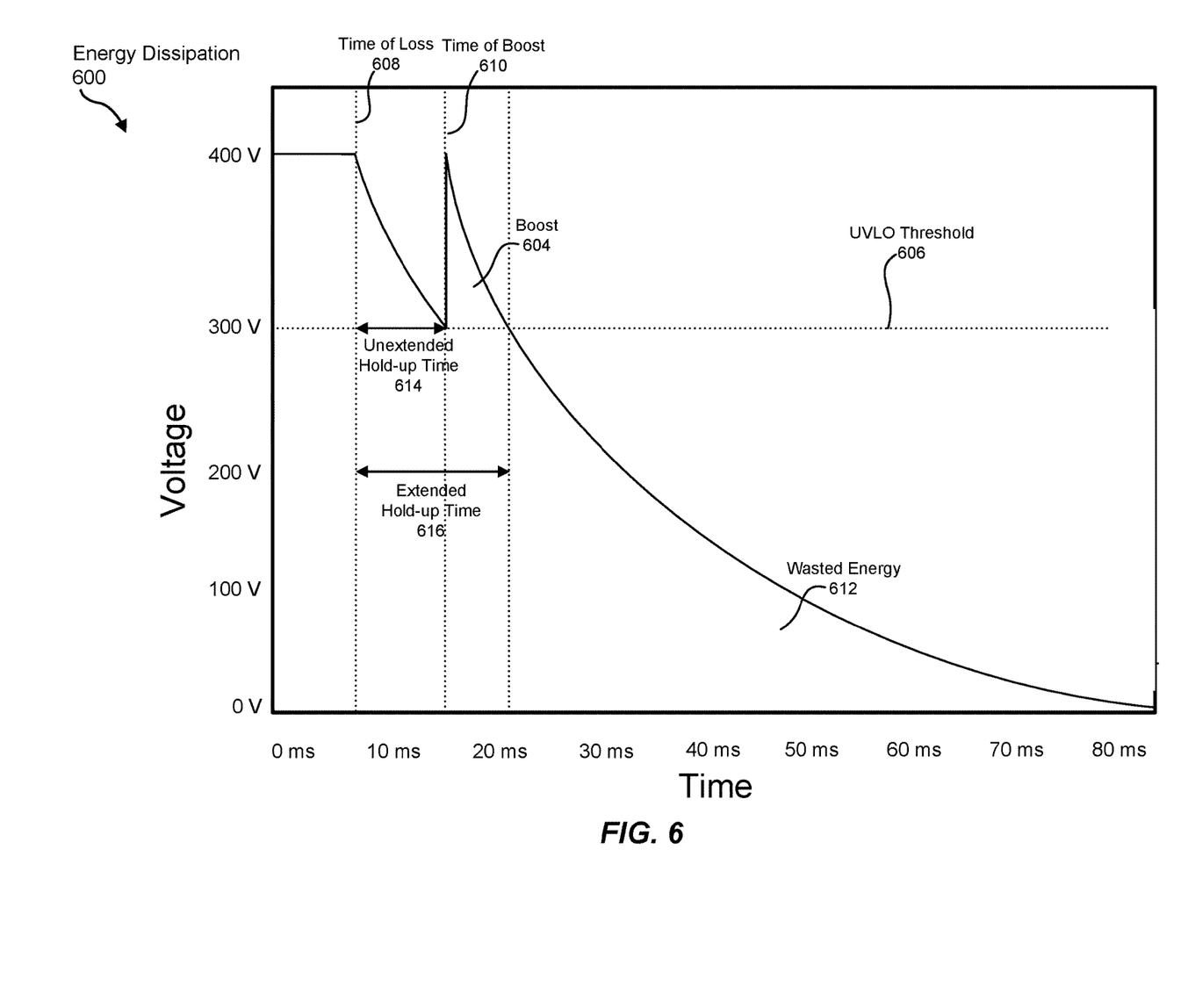
FIG. 6 is an illustration of an exemplary representation of energy dissipated by a PSU after the loss of an AC power source according to one or more embodiments of this disclosure.

FIG. 6 illustrates an exemplary energy dissipation 600 of capacitors 306(1)-(3) in PSU 102 via power rail 410 after the AC source electrically coupled to PSU 102 is lost and/or goes down. As illustrated in FIG. 6, energy dissipation 600 may involve the voltage level of power rail 410 dropping from 400 volts toward 0 volts over a period of roughly 90 milliseconds. In some examples, a conventional PSU may support, facilitate, and/or provide an unextended hold-up time 614 of approximately 10 milliseconds from a time of loss 608 at which the AC source goes down. For example, the voltage level of power rail 410 may drop from 400 volts toward a UVLO threshold 606 at 300 volts due at least in part to the loss of the AC source. In this example, the voltage level of power rail 410 may involve no boosting after time of loss 608 until reaching a time of boost 610.

However, PSU 102 may support, facilitate, and/or provide an extended hold-up time 616 of approximately 14 milliseconds from time of loss 608 at which the AC source goes down. For example, the voltage level of power rail 410 may drop from 400 volts toward UVLO threshold 606 at 300 volts due at least in part to the loss of the AC source. In this example, the voltage of power rail 410 may then spike back up toward 400 volts at time of boost 610 when circuit 316 is modified to extend the hold-up time of PSU 102. In this example, the voltage level of power rail 410 may gain a boost 604 that extends and/or prolongs the time that the voltage level remains and/or stays above UVLO threshold 606. In certain implementations, energy dissipation 600 may involve wasted energy 612 that is lost and/or unusable due at least in part to PWM stage 308 of PSU 102 being unable to function properly when the voltage level of power rail 410 drops below UVLO threshold 606.

In some examples, the various apparatuses, devices, and/or systems described in connection with FIGS. 1-6 may include and/or represent one or more additional circuits, components, and/or features that are not necessarily illustrated and/or labeled in FIGS. 1-6. For example, apparatus 100, system 200, and/or PSU 102 may also include and/or represent additional analog and/or digital circuitry, onboard logic, transistors, antennas, resistors, capacitors, diodes, inductors, switches, registers, flipflops, connections, traces, buses, semiconductor (e.g., silicon) devices and/or structures, processing devices, storage devices, circuit boards, packages, substrates, housings, combinations or variations of one or more of the same, and/or any other suitable components that facilitate and/or support extending hold-up times. In certain implementations, one or more of these additional circuits, components, and/or features may be inserted and/or applied between any of the existing circuits, components, and/or features illustrated in FIGS. 1-6 consistent with the aims and/or objectives described herein. Accordingly, the electrical and/or communicative couplings described with reference to FIGS. 1-6 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides electrical continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide electrical continuity from one of those two components to the other. In other words, the indirect coupling may include and/or incorporate at least one additional component between those two components.

Figure 7:
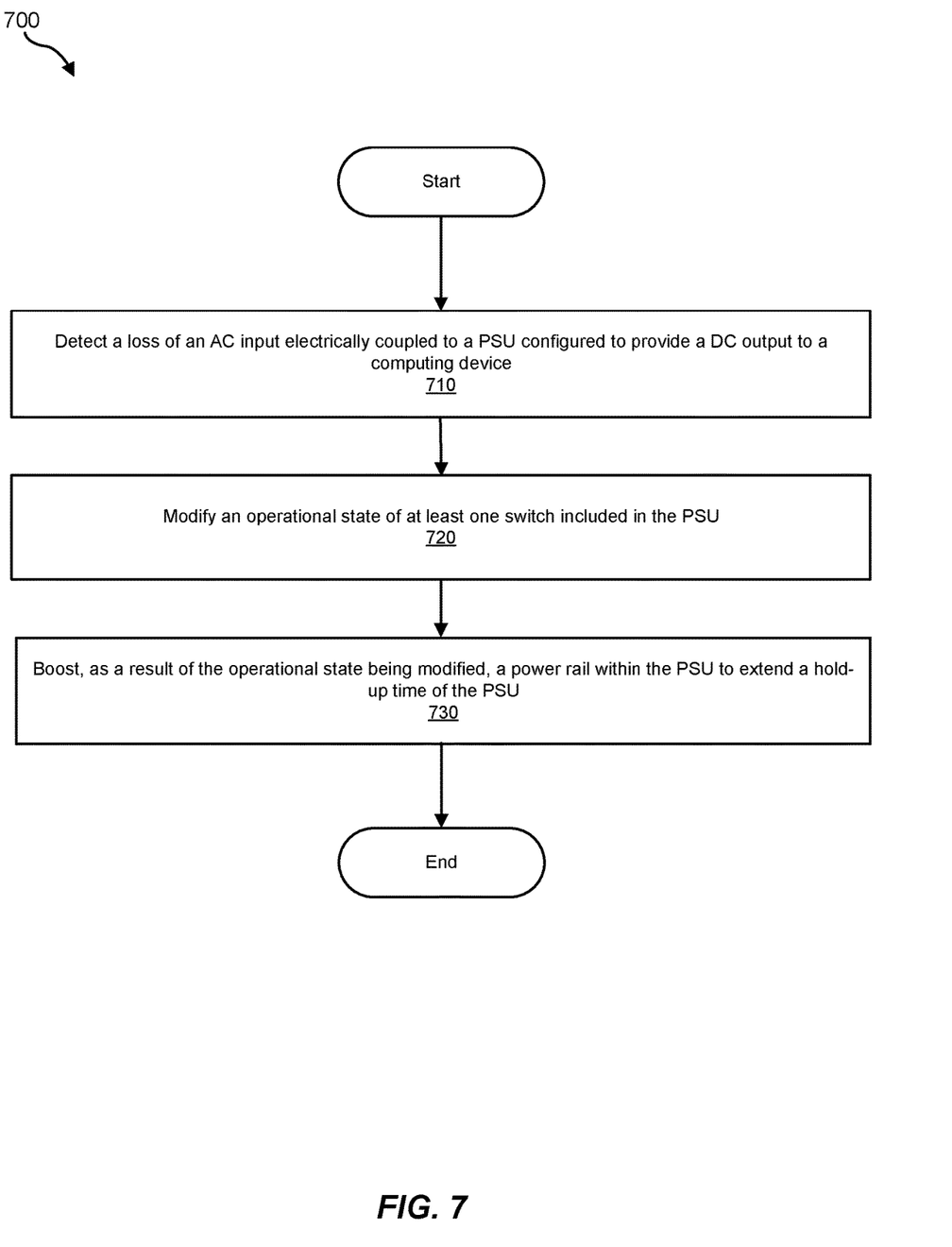
FIG. 7 is a flow diagram of an exemplary method for boosting internal voltages of PSUs to extend hold-up times according to one or more embodiments of this disclosure.

FIG. 7 is a flow diagram of an exemplary method 700 for boosting internal voltages of PSUs to extend hold-up times. In one example, the steps shown in FIG. 7 may be performed by a controller incorporated into and/or associated with a computing device powered by a PSU. Additionally or alternatively, the steps shown in FIG. 7 may incorporate and/or involve certain sub-steps and/or variations consistent with the descriptions provided above in connection with FIGS. 1-6.

As illustrated in FIG. 7, method 700 may include and/or involve the step of detecting a loss of an AC input electrically coupled to a PSU configured to provide a DC output to a computing device (710). Step 710 may be performed in a variety of ways, including any of those described above in connection with FIGS. 1-6. For example, a controller may detect the loss of an AC input electrically coupled to a PSU that provides a DC output to a computing device. In one example, the loss of the AC input may occur as a result of a power outage. In another example, the loss of the AC input may occur as a result of the PSU's power cable getting unplugged and/or disconnected from the wall outlet or the PSU itself.

Method 700 may also include and/or involve the step of modifying an operational state of at least one switch included in the PSU (720). Step 720 may be performed in a variety of ways, including any of those described above in connection with FIGS. 1-6. For example, the controller may modify the operational states of configurable switches (e.g., transistors) included in the PSU. In one example, the controller may initiate and/or perform this modification to the operational states of the switches in response to detecting the loss of the AC input.

Method 700 may further include and/or involve the step of boosting, as a result of the operational state being modified, a power rail within the PSU to extend the hold-up time of the PSU (730). Step 730 may be performed in a variety of ways, including any of those described above in connection with FIGS. 1-6. For example, the modified operational states of the switches included in the PSU may cause the voltage level of a power rail within the PSU to increase and/or spike momentarily. In this example, the increase and/or spike in the voltage level of the power rail may enable a PWM stage of the PSU to continue functioning (e.g., producing a suitable DC output) longer, thereby extending the hold-up time of the PSU.

In some examples, one or more of the exemplary embodiments disclosed herein may be encoded as a computer program (also referred to as computer software, software applications, computer-readable instructions, and/or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a power supply unit (PSU) that comprises:
      a first switch electrically coupled between a first node and a second node;
      a second switch electrically coupled between a third node and a fourth node;
      a third switch electrically coupled between the third node and a fifth node;
      a first capacitor electrically coupled between the first node and the third node;
      a second capacitor electrically coupled between the second node and the fourth node; and
      a third capacitor electrically coupled between the fourth node and the fifth node, wherein:
         the PSU is configured to:
            convert power from an alternating current (AC) input into a direct current (DC) output; and
            provide the DC output to a computing device;
         the first node comprises a power rail configured to deliver electric current from the first capacitor and the second capacitor to a pulse-width modulation (PWM) stage of the PSU;
         the third node comprises a variable node configured to be selectively shorted to an electrical ground when the second switch is opened and the third switch is closed;
         the fourth node comprises a branching node configured to provide electric current from the third capacitor to the PWM stage via the first capacitor and the second capacitor when the second switch is closed and the third switch is opened; and
         the fifth node comprises the electrical ground; and
   circuitry configured to:
      detect a loss of the AC input; and
      in response to detecting the loss of the AC input, extend a hold-up time of the PSU by modifying an operational state of at least one switch included in the PSU.

2. The apparatus of claim 1, wherein:
   the PSU is further configured to output, to the circuitry, an undervoltage lockout (UVLO) signal that indicates whether the PSU is able to provide a sufficient amount of power to sustain the computing device; and
   the circuitry is further configured to detect the loss of the AC input based at least in part on the UVLO signal.

3. The apparatus of claim 1, wherein the first switch comprises a transistor with a body diode that prevents passage of electric current from the first node to the second node when the transistor is deactivated.

4. The apparatus of claim 1, wherein the circuitry is further configured to modify the operational state of the at least one switch to boost a voltage level of the power rail.

5. The apparatus of claim 4, wherein the circuitry is further configured to boost the voltage level of the power rail by at least twenty-five percent.

6. The apparatus of claim 4, wherein the circuitry is further configured to boost the voltage level of the power rail in response to detecting the loss of the AC input by:
opening the third switch;
opening the first switch after the third switch is opened; and
closing the second switch after the first switch is opened.

7. The apparatus of claim 1, wherein the at least one switch comprises a transistor whose gate is electrically coupled to the circuitry.

8. The apparatus of claim 1, wherein the circuitry is further configured to extend the hold-up time of the PSU by at least fifteen percent.

9. A system comprising:
a computing device;
a power supply unit (PSU) that comprises:
a first switch electrically coupled between a first node and a second node;
a second switch electrically coupled between a third node and a fourth node;
a third switch electrically coupled between the third node and a fifth node;
a first capacitor electrically coupled between the first node and the third node;
a second capacitor electrically coupled between the second node and the fourth node; and
a third capacitor electrically coupled between the fourth node and the fifth node, wherein:
the PSU is configured to:
convert power from an alternating current (AC) input into a direct current (DC) output; and
provide the DC output to a computing device;
the first node comprises a power rail configured to deliver electric current from the first capacitor and the second capacitor to a pulse-width modulation (PWM) stage of the PSU;
the third node comprises a variable node configured to be selectively shorted to an electrical ground when the second switch is opened and the third switch is closed;
the fourth node comprises a branching node configured to provide electric current from the third capacitor to the PWM stage via the first capacitor and the second capacitor when the second switch is closed and the third switch is opened; and
the fifth node comprises the electrical ground; and
circuitry configured to:
detect a loss of the AC input; and
in response to detecting the loss of the AC input, extend a hold-up time of the PSU by modifying an operational state of at least one switch included in the PSU.

10. The system of claim 9, wherein:
the PSU is further configured to output, to the circuitry, an undervoltage lockout (UVLO) signal that indicates whether the PSU is able to provide a sufficient amount of power to sustain the computing device; and
the circuitry is further configured to detect the loss of the AC input based at least in part on the UVLO signal.

11. The system of claim 9, wherein the first switch comprises a transistor with a body diode that prevents passage of electric current from the first node to the second node when the transistor is deactivated.

12. The system of claim 9, wherein the circuitry is further configured to modify the operational state of the at least one switch to boost a voltage level of the power rail.

13. The system of claim 12, wherein the circuitry is further configured to boost the voltage level of the power rail by at least twenty-five percent.

14. A method comprising:
detecting, by circuitry, a loss of an alternating current (AC) input electrically coupled to a power supply unit (PSU) configured to provide a direct current (DC) output to a computing device, wherein:
the PSU comprises:
a first switch electrically coupled between a first node and a second node;
a second switch electrically coupled between a third node and a fourth node;
a third switch electrically coupled between the third node and a fifth node;
a first capacitor electrically coupled between the first node and the third node;
a second capacitor electrically coupled between the second node and the fourth node; and
a third capacitor electrically coupled between the fourth node and the fifth node;
the first node comprises a power rail configured to deliver electric current from the first capacitor and the second capacitor to a pulse-width modulation (PWM) stage of the PSU;
the third node comprises a variable node configured to be selectively shorted to an electrical ground when the second switch is opened and the third switch is closed;
the fourth node comprises a branching node configured to provide electric current from the third capacitor to the PWM stage via the first capacitor and the second capacitor when the second switch is closed and the third switch is opened; and
the fifth node comprises the electrical ground; and
in response to detecting the loss of the AC input:
modifying, by the circuitry, an operational state of at least one switch included in the PSU; and
boosting, as a result of the operational state being modified, a power rail within the PSU to extend a hold-up time of the PSU.

\* \* \* \* \*